Aug. 4, 1953 E. O. LUNDE 2,647,472
DUMP CAR DOOR CONTROL MEANS
Filed May 5, 1949 3 Sheets-Sheet 3
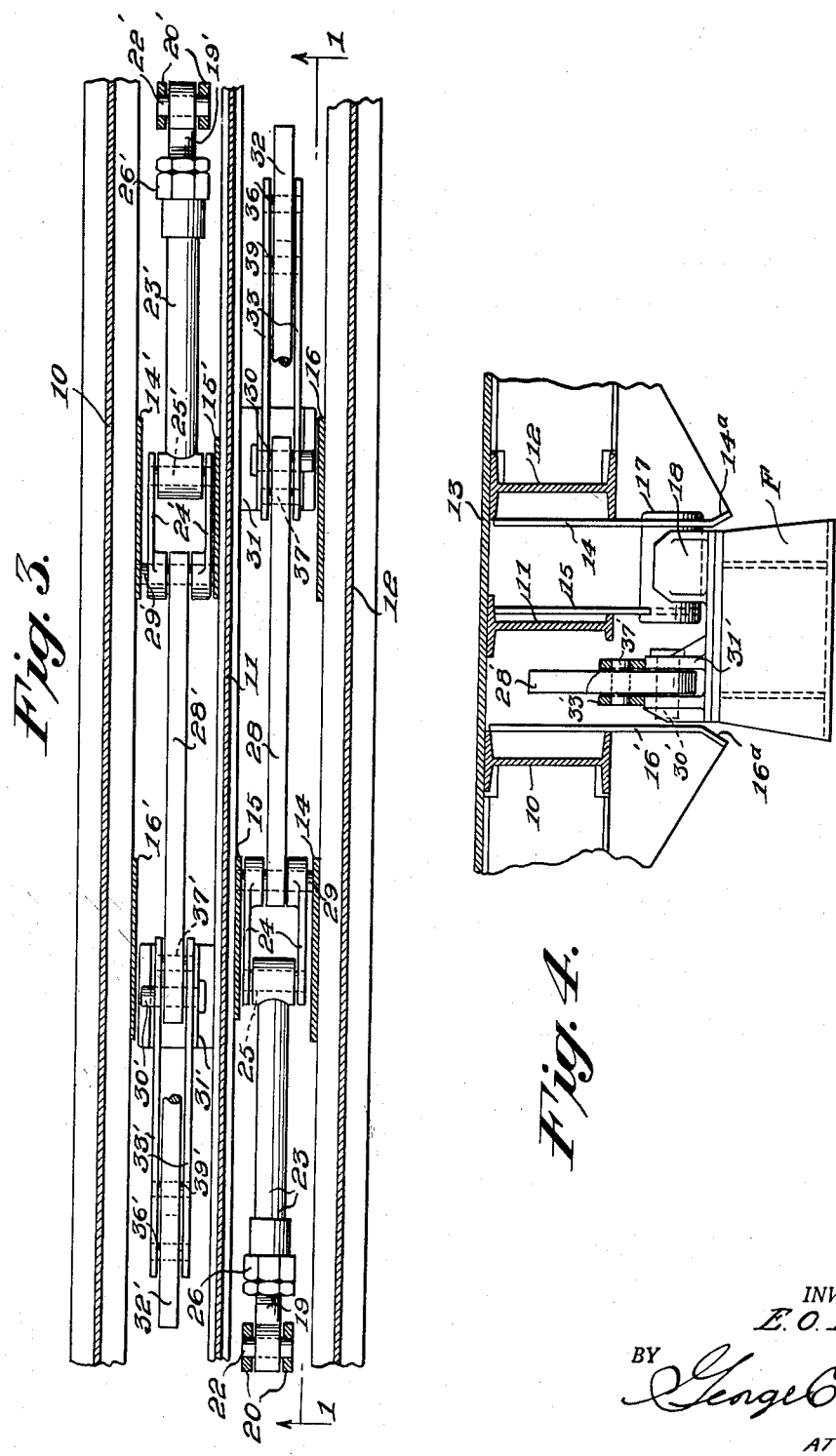
INVENTOR.
E. O. Lunde
BY George E. Cook.
ATTORNEY Patented Aug. 4, 1953

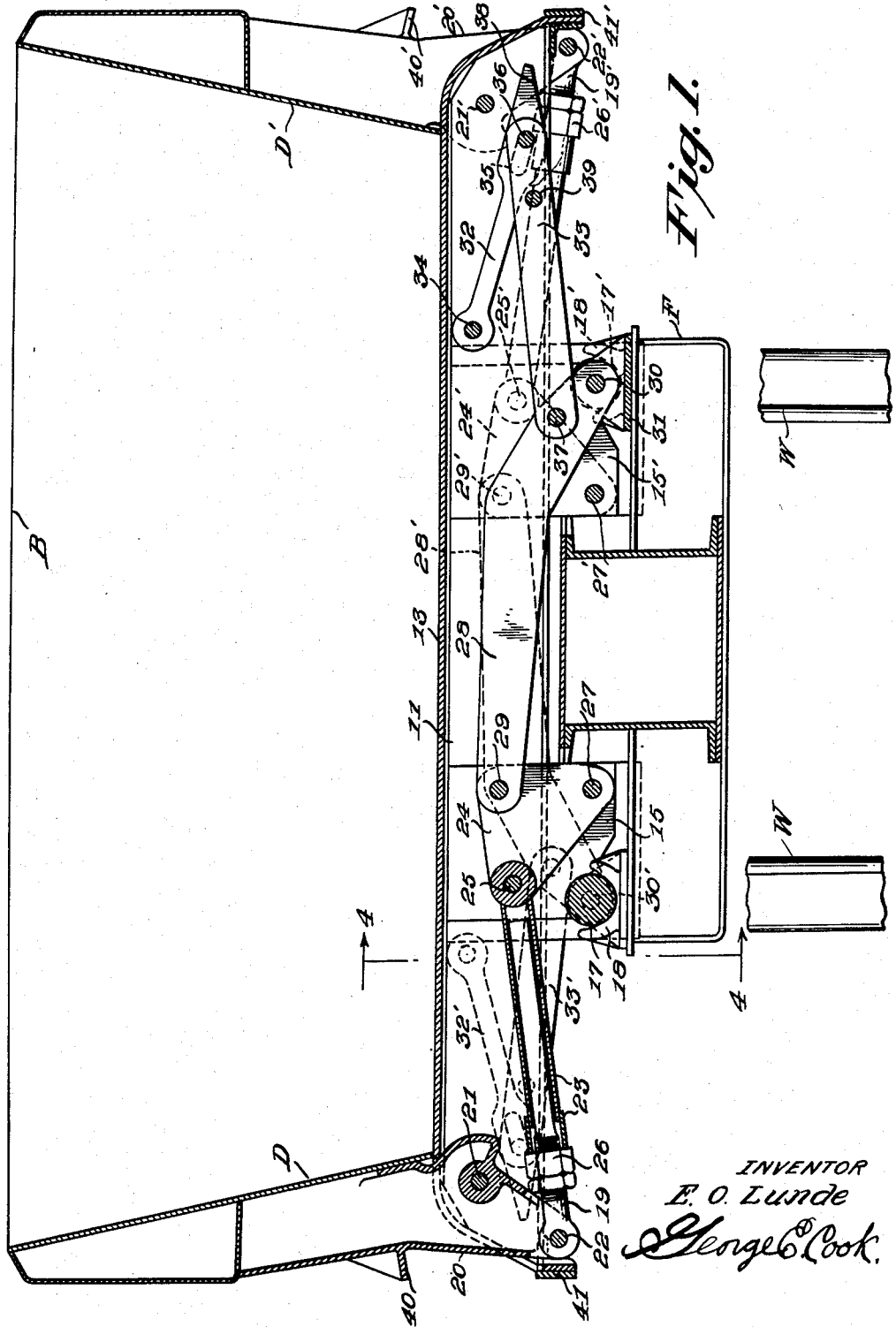

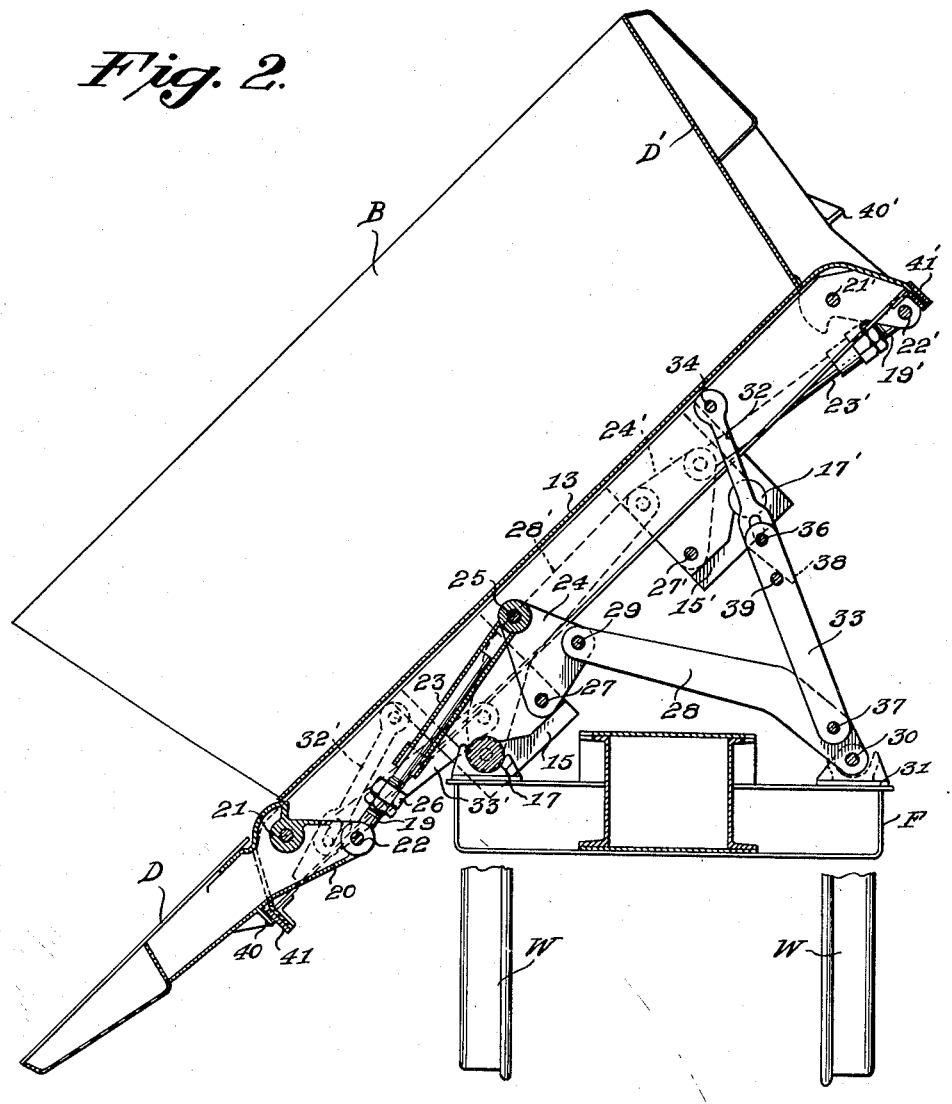

2,647,472

UNITED STATES PATENT OFFICE 2,647,472

DUMP CAR DOOR CONTROL MEANS

Einar O. Lunde, Wyckoff, N. J., assignor to Magor Car Corporation, New York, N. Y., a corporation of Delaware Application May 5, 1949, Serial No. 91,557

8 Claims. (Cl. 105—272)

This invention relates to dump car door control means.

The invention is more particularly concerned with a dump car wherein the body thereof is supported on an underframe for tilting movement toward one side or the other thereof, and wherein one or more doors are provided at each side of the body and pivotally connected therewith adjacent their lower ends, and a novel linkage disposed beneath the floor of the car body and operatively associated with the doors for permitting opening thereof upon tilting movement of the body.

It is a primary object of the invention to provide door control means in a dump car having a tiltable body wherein a door at each side of the body is normally retained in closed position, and wherein, upon tilting of the body toward one side or the other the corresponding door will be permitted to open under the action of gravity.

A further object of the invention is to provide door control means for doors at the opposite sides of a tiltable body of a dump car which normally precludes opening of the doors, and which are operative upon tilting movement of the body to permit the door at the side of the body in the direction of tilting movement to open while maintaining the door at the opposite side in closed position.

A still further object of the invention is to provide door control means which are relatively simple in structure and which are dependable in operation.

Other objects and advantages of the invention will become apparent in the course of the following detailed description, taken in connection with the accompanying drawings, wherein:

Fig. 1 is a transverse sectional view of a dump car showing the application of the improved door control means in accordance with a preferred structural embodiment thereof, the section being substantially in the plane of line 1—1 on Fig. 3.

Fig. 2 is a sectional view corresponding to Fig. 1, but showing the car body in dumping position and with one door thereof open.

Fig. 3 is a top plan view of the linkage embodied in the door control means.

Fig. 4 is a vertical fragmental sectional view substantially in the plane of line 4—4 on Fig. 1.

In the drawings, the dump car is shown fragmentally with portions of the wheels W indicated and only so much of the car is shown as is necessary for an understanding of the instant invention.

The car is preferably provided with a bolster F at or adjacent each end thereof and the views on the drawings are at a point of one of the bolsters.

Each bolster is specially constructed for supporting two sets of oppositely acting linkage and for this purpose the car body includes three transverse and equally spaced I-beams 10, 11 and 12 having their upper flanged portions engaging and supported by the car body floor 13, thereby providing a pair of channels extending transversely of the body and each adapted to receive one of the two sets of linkage.

A pair of laterally spaced mounting plates 14 and 15 are disposed between and suitably secured to the I-beams 11 and 12 to the left of the longitudinal center line of the body and a similar pair of mounting plates 14' and 15' are disposed between and secured to the I-beams 10 and 11 to the right of the longitudinal center line of the body.

The car body further includes a guide and retaining plate 16 disposed between the I-beams 11 and 12 and a similar guiding end retaining plate 16' disposed between the I-beams 10 and 11.

It will be seen upon inspection of Figs. 3 and 4 that the plates 14 and 16' and likewise the plates 14' and 16 provide a pair of laterally spaced plates for engaging opposite sides of the car underframe as in Fig. 4 for holding the car body when in transit against longitudinal movement on the underframe and in order to guide these plates to their normal positions relative to the underframe, the lower edges thereof are outwardly flared as indicated at 14ª and 16ª in Fig. 4.

The mounting plates 14 and 15 support a relatively large cylindrical pin 17 which is rotatably supported in a bracket 18 on the underframe and a similar pin 17' is supported by plates 14' and 15', and which is rotatably supported in a bracket 18' on the underframe.

By the provision of the pin and bracket at each end of the bolster the body is supported for tilting movement toward either side thereof under any desired force.

The linkage above referred to and about to be described is for the purpose of retaining the doors D, D' in closed position when the car body B is in normal transit position as in Fig. 1, while permitting one or the other door to open when the body is dumped as in Fig. 2.

While as above stated there are two sets of linkage at each bolster, one for controlling one door and the other for controlling the other door, the linkage controlling door D will be described in detail and the linkage controlling door D' will be designated by the same reference numerals primed.

Before proceeding with a description of the linkage, it is to be noted that the doors D, D' are provided with arms 20, 20' which are pivotally supported on pins 21, 21' mounted on the car body B.

The lower end of arm 20 is pivotally connected to a rod 19 by means of a pin 22. The rod is slidably mounted in a sleeve 23 which at one end thereof is pivotally connected to a bell crank 24 by means of a pin 25.

The rod is provided with an adjustable abutment 26 which normally bears on the adjacent end of the sleeve 23 as is indicated in Fig. 1. The bell crank 24 is substantially triangular in form with the said pivotal connection 25 at one vertex thereof. The bell crank is pivotally connected at another vertex thereof on a pin 27 supported by the plates 14 and 15 which are rigid with the car body B.

The bell crank is further pivotally connected at its third vertex to one end of a link 28 by means of a pin 29. The other end of the link is connected to the underframe by means of a pin 30 carried in a bracket 31 rigid with the underframe. It is to be noted at this point that the pivot pins 30, 30' are axially alined with the above mentioned bearing pins 17, 17' but on opposite sides of the central I-beam 11. It is to be still further noted that the bearing pins 17, 17' are not shown in Fig. 3 for the sake of clarity in illustration.

Body tilting limiting links 32 and 33 may be provided, the former of which is pivotally connected at one end thereof by a pin 34 and which adjacent its opposite end is provided with an elongated slot 35 in which is disposed a pin 36 carried by one end of link 33 whose opposite end is pivotally connected to link 28 by means of a pin 37. The free end of link 32 is provided with a camming edge 38 which cooperates with a pin 39 carried by link 33 for a purpose later to appear. The tilting limiting links per se as above referred to are not a novel feature of the present invention.

The doors D, D' are provided with stop lugs 40, 40' which are engageable with stops 41, 41' as will appear in the further description of the construction.

The linkage for controlling door D' is of the same construction as that above described in connection with the door D but acts in an opposite direction.

Upon consideration of Fig. 1, it will be seen that while the doors D, D' incline laterally outward of the body B, they are restrained against opening by gravity by their corresponding linkage. Thus considering the door D, the opening tendency thereof will cause an inward thrust by arms 20 and which would tend to rotate bell crank 24 on its pivot 27 through the rod 19, sleeve 23 and abutment 26. The bell crank 24 however, is restrained against rotation by means of the link 28 whose remote end is pivotally connected with the bolster F, as above described. Thus, it will be seen that the doors D, D' are positively held in closed position when the body is in horizontal transit position.

The linkage is such however, that upon tilting of the body B in a dumping operation, the door at the side thereof toward which the body is being tilted will be permitted to open during the tilting operation of the body and an explanation of such action will be apparent from Fig. 2 to which attention will now be directed.

In Fig. 2 the car body B has been tilted toward the left and the door D has opened.

Upon the application of a desired force under the right hand side of the body, same will pivot on the pin 17 while the other bearing pin 17' will be raised from its seating bracket 18'. Upon the initiating of such tilting movement, the plates 14 and 15 will be bodily raised with the car body and while the bell crank 24 will also be raised, the link connection 28 will cause the bell-crank to rotate clockwise on its pivot 27 thereby moving the sleeve 23 out of contact with the abutment 26, and permitting rod 19 to move within the sleeve toward the pin 25 and thus allow the door D to open as the car body continues its tilting movement.

The door D', however, will open in the same manner as door D upon tilting the body on the pin 17'. When the body B has been tilted to a predetermined angle as in Fig. 2, the links 32 and 33 will be alined and the engagement of pin 36 with the lower end of slot 35 will preclude any further tilting movement.

Also the lug 40 will have engaged the stop 41 with the door disposed substantially in alinement with the floor 13 of the body B.

When the links 32 and 33 are alined, the pin 39 is in engagement with the camming edge 38 of link 32, and thus upon releasing the body tilting force to restore the body to normal horizontal position, downward movement of the link 32 as afforded by slot 35 will cause the links 32 and 33 to become misalined, whereby they will not interfere with the downward movement of the body, the links eventually assuming their normal positions as in Fig. 1.

The abutments 26, 26' are adjustable on the rods 19, 19' whereby the opening of the doors may be sensitively controlled.

From the above description it should be appreciated that a door control means is provided which, while being relatively simple in construction, is dependable, and highly efficient in operation.

While I have disclosed my invention in accordance with a single specific embodiment thereof, such is to be considered as illustrative only and not restrictive, the scope of the invention being defined in the sub-joined claims.

What I claim and desire to secure by United States Letters Patent is:

1. In a dump car including an underframe and body supported thereon for tilting movement about an axis adjacent one side thereof, a door disposed at said side of the body and pivotally connected thereto adjacent the floor thereof, and cooperating rod, crank and link means interconnecting the underframe with said door below its pivotal connection with the body, said means being operative to retain the door closed when the body is in horizontal normal position and said rod, crank and link being movable relative to the body to permit said door to open upon tilting of the body about said axis, said means comprising an elongated link having one end thereof pivotally connected to said underframe, adjacent the opposite side of the body, a substantially triangular bell crank disposed between said axis and said link and to which the opposite end of said link is pivotally connected adjacent one vertex thereof, the bell crank being pivotally supported by the body adjacent a second vertex thereof, an elongated sleeve having one end thereof pivotally connected to the bell crank adjacent the third vertex thereof and a rod slidably disposed in said sleeve and having one end thereof pivotally connected to the door, and an abutment on said rod for engaging the opposite end of said sleeve.

2. The structure according to claim 1 together with a pair of cooperating links having a pin and slot connection at adjacent ends thereof, and the opposite ends thereof being respectively pivoted to the body and said first link, and said pair of links assuming alined positions upon tilting of the body to a predetermined angle and acting to limit the tilting to such angle.

3. The structure according to claim 2, together with pin and cam means on said pair of links operative to move said links out of alinement upon initial movement of said body to its horizontal normal position.

4. In a dump car including an underframe having a transversely extending bolster, a pair of brackets rigid with the bolster adjacent each end thereof, one bracket of each pair thereof presenting an upwardly facing arcuate seat, a body having a cylindrical pin supported thereby adjacent each side thereof for engagement in the respective bracket seat whereby either side of the body may be raised from the bolster while the other side pivots about the axis of the respective pin, a door supported by the body at each side thereof and having pivotal connection therewith below the floor thereof, and rod, crank and link means disposed below said floor and interconnecting each door below the pivotal connection thereof with the other bracket of the pair at the end of the bolster remote from the door, said means being operative to retain the doors closed when the body is in horizontal position and said rod, crank and link being movable relative to the body to permit either door to open when the body is tilted in the direction thereof, three laterally and suitably spaced beams depending from the floor of said body and above said bolster in the provision of a pair of channels extending transversely of the body, and each of said door control means being disposed within one of said channels.

5. In a dump car including an underframe having a transversely extending bolster, a pair of brackets rigid with the bolster adjacent each end thereof, one bracket of each pair thereof presenting an upwardly facing arcuate seat, a body having a cylindrical pin supported thereby adjacent each side thereof for engagement in the respective bracket seat whereby either side of the body may be raised from the bolster while the other side pivots about the axle of the respective pin, a door supported by the body at each side thereof and having pivotal connection therewith below the floor thereof, and rod, crank and link means disposed below said floor and interconnecting each door below the pivotal connection thereof with the other bracket of the pair at the end of the bolster remote from the door, said means being operative to retain the doors closed when the body is in horizontal position and said rod, crank and link being movable relative to the body to permit either door to open when the body is tilted in the direction thereof, said means comprising a rod having one end thereof pivotally connected to a respective door, a substantially triangular bell crank disposed adjacent the pin next to said door and being pivotally connected to the body adjacent one vertex thereof, an elongated sleeve having one end thereof pivotally connected to the bell crank adjacent a second vertex thereof and slidably receiving said rod, an adjustable abutment on said rod engageable with the opposite end of said sleeve when the body is in horizontal position and the door closed, and an elongated link having one end thereof pivotally connected to the bell crank adjacent third vertex thereof and having its opposite end pivotally connected to the other bracket of the pair at the end of the bolster opposed to said door.

6. In a dump car including an underframe having a transversely extending bolster, a pair of brackets rigid with the bolster adjacent each end thereof, one bracket of each pair thereof presenting an upwardly facing arcuate seat, a body having a cylindrical pin supported thereby adjacent each side thereof for engagement in the respective bracket seat whereby either side of the body may be raised from the bolster while the other side pivots about the axis of the respective pin, a door supported by the body at each side thereof and having pivotal connection therewith below the floor thereof, and rod, crank and link means disposed below said floor and interconnecting each door below the pivotal connection thereof with the other bracket of the pair at the end of the bolster remote from the door, said means being operative to retain the doors closed when the body is in horizontal position and said rod, crank and link being movable relative to the body to permit either door to open when the body is tilted in the direction thereof, and pairs of laterally spaced plates depending from the body and engageable with opposite sides of the bolster for restraining movement of the body laterally of the bolster.

7. In a dump car, an underframe having a transversely extending bolster, a pair of brackets rigid with the bolster adjacent each end thereof, the brackets being spaced transversely of the bolster with one thereof adjacent each side of the bolster, one bracket of each pair adjacent opposite sides of the bolster presenting an upwardly facing arcuate seat, spaced plates depending from the body adjacent each side thereof, a cylindrical pin supported by each pair of plates for engaging a respective one of said seats, whereby either side of said body may be raised with the opposite side pivoting about the corresponding pin, a door on each side of said body and pivotally connected thereto below the floor thereof, an arm depending from each door below its pivotal connection, and control means for each door operative to retain both doors closed when the body is in normal horizontal position and to permit either door to open upon tilting of the body in the direction of such door, said control means comprising a rod pivotally connected to each arm, a substantially triangular bell crank pivotally supported adjacent one vertex thereof between the plates of each pair thereof, an elongated sleeve having one end thereof pivotally connected to each of said bell cranks adjacent a second vertex thereof and slidably receiving said rod, and an elongated link having one end thereof pivotally connected to each bell crank adjacent the third vertex thereof, the opposite ends of said links being pivotally connected to the other brackets at the opposite ends of the bolster, and an adjustable abutment on each rod engageable with the opposite end of the respective sleeve when the body is in normal horizontal position.

8. The structure according to claim 7, together with other plates depending from the body, said other plates including one at one side of one of said pairs of plates and another at the opposite side of the other of said pairs of plates, and said other plates together with opposed ones of said pairs of plates being engageable with opposite sides of the bolster when the body is in normal horizontal position.

EINAR O. LUNDE.

References Cited in the file of this patent

UNITED STATES PATENTS

| Number | Name | Date |
|---|---|---|
| 230,918 | Burns | Aug. 10, 1880 |
| 1,333,293 | Clark et al. | Mar. 9, 1920 |
| 1,712,534 | Walsh et al. | May 14, 1929 |
| 1,749,530 | Flowers | Mar. 4, 1930 |
| 1,935,974 | Burner | Nov. 21, 1933 |